United States Patent [19]

Douaud et al.

[11] Patent Number: 4,715,341

[45] Date of Patent: Dec. 29, 1987

[54] METHOD OF AND DEVICE FOR AUTOMATICALLY ADJUSTING THE IGNITION TIMING OF A CONTROLLED IGNITION ENGINE

[75] Inventors: Andre Douaud, Puteaux; Joseph Rialan, Meudon, both of France

[73] Assignee: Institut Francais du Petrole, Rueil-Malmaison, France

[21] Appl. No.: 309,148

[22] Filed: Oct. 6, 1981

Related U.S. Application Data

[63] Continuation-in-part of Ser. No. 241,159, Mar. 6, 1981, abandoned, which is a continuation of Ser. No. 61,125, Jul. 26, 1979.

[30] Foreign Application Priority Data

Jul. 26, 1978 [FR] France ............................... 78 22542

[51] Int. Cl.[4] .............................................. F02P 5/04
[52] U.S. Cl. .................................... 123/425; 123/419; 123/435
[58] Field of Search ............... 123/425, 426, 406, 419, 123/435

[56] References Cited

U.S. PATENT DOCUMENTS 3,903,856  9/1975  McDougal ......................... 123/426
4,130,097  12/1978  Ford ................................. 123/425

Primary Examiner—Ronald B. Cox
Attorney, Agent, or Firm—Millen & White

[57] ABSTRACT

The method comprises detecting, during the combustion phase in at least one engine cylinder, the angular position of the crankshaft at which the value of the ratio of the volume of burnt gases to the overall gas volume in the cylinder reaches a preselected value, and adjusting the ignition timing to make said detected position of the crankshaft coincide with a predetermined position. The method also includes detecting for all cycles of operation the flame front in all the cylinders of the engine. The number of signals delivered by one of the detectors are counted for a specified number of cycles of operation of the engine and the average value of the change in angular position of the crankshaft during which time said signals are counted is determined. Accordingly, depending upon whether the number of signals counted in another cylinder falls below or above the count in the first cylinder, a corresponding reference signal is produced for controlling ignition timing.

16 Claims, 7 Drawing Figures

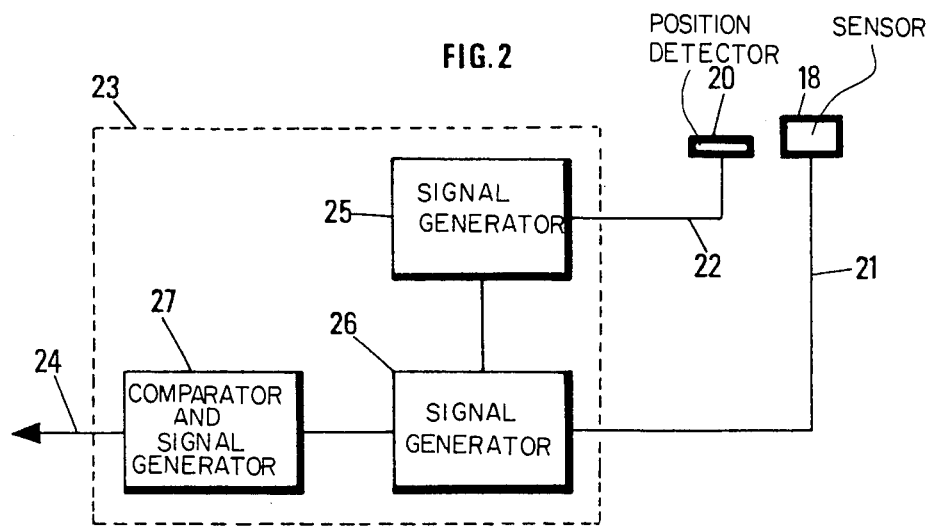
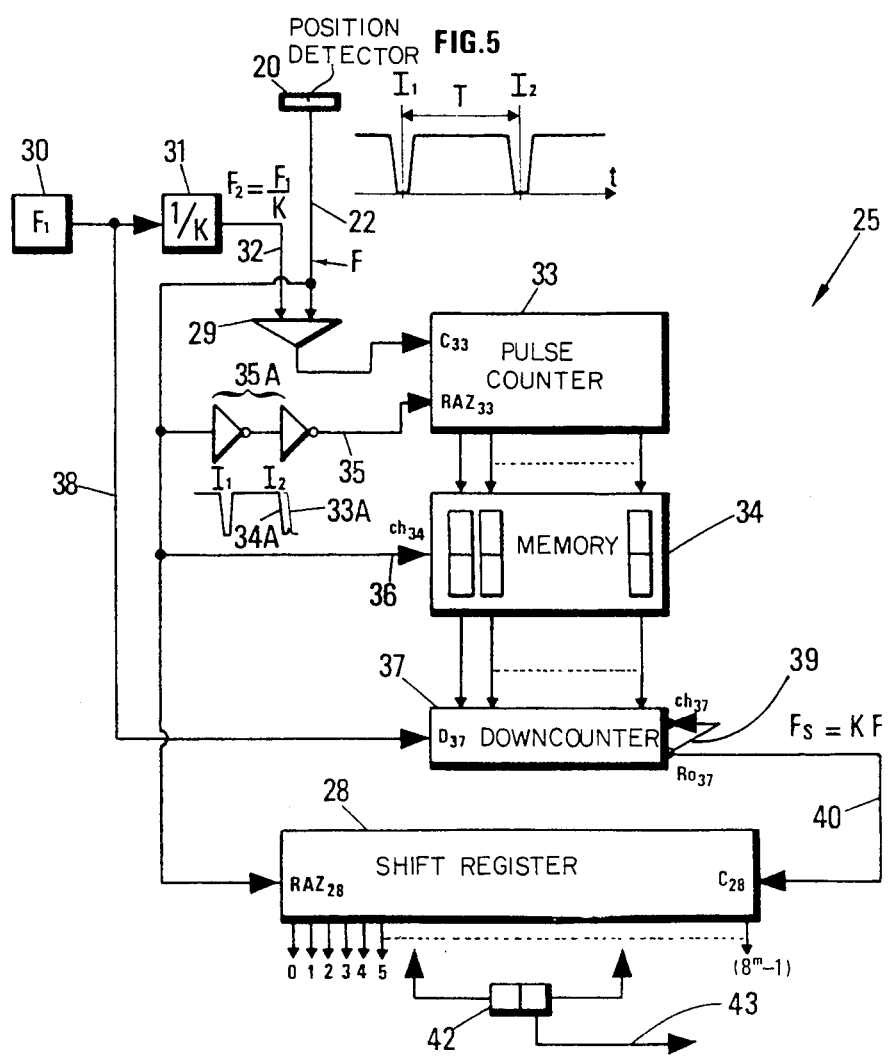

METHOD OF AND DEVICE FOR AUTOMATICALLY ADJUSTING THE IGNITION TIMING OF A CONTROLLED IGNITION ENGINE

This application is a continuation-in-part of application Ser. No. 241,159, filed Mar. 6, 1981, now abandoned, which is a continuation of abandoned application Ser. No. 61,125 filed July 26, 1979, and the subject matter of both said prior applications is specifically incorporated by reference herein.

BACKGROUND OF THE INVENTION

The invention relates to a method of and a device for automatically adjusting the ignition timing of a controlled ignition engine in relation to the selected operating conditions for the engine. The conditions include, but are not limited exclusively to the operation of the engine with an optimum spark advance for obtaining a maximum power output therefrom.

It has been proposed in the prior art to measure various different specific parameters for determining the operating condition of the engine. More specifically, parameters such as the running speed, i.e., RPM, temperature, vacuum in the intake manifold, etc. characterize the operating condition of the engine, and are used in appropriately adapted methods, e.g., by mathematical computations, to determine the spark advance corresponding to the desired operating condition of the engine, and for causing sparking at a time corresponding to the desired spark advance.

According to U.S. Pat. No. 3,875,912 the spark timing is adjusted so that the "explosion" in the cylinder head occurs at a predetermined angular position of the crankshaft for at least one cylinder. To accomplish this the pressure in the specified cylinder is measured by means of a pressure sensor which provides an electronic pulse having a sharp leading edge. The time at which the pressure reaches, as the signal increases, a preselected threshold value is defined as the "explosion" time.

According to British Patent No. 1,483,611 two different stages of the combustion of the fuel mixture in the cylinder are sensed. The first stage is after the initiation of the spark and corresponds to a low pressure stage. The second stage occurs at a subsequent point in time when a sudden rise in both the pressure and temperature within the cylinder is observed. The British Patent teaches that the commencement of the second stage can be sensed and the spark advance is adjusted so that said commencement of the second stage occurs at one fixed preselected crankshaft angular position, without regard to the other variables which influence the spark timing requirement.

German Patent No. 1,476,322 teaches the control of the spark timing in relation to a measurement of the engine output, as indicated by two pressure valves, and measured by pressure sensors located in the engine cylinders.

According to the published German patent application No. 2,030,679, variations in the engine torque can be detected and the spark timing adjusted in response to the detected value of the engine torque.

The prior solutions may give satisfactory results but do not permit accurate adjustment of the spark timing to the optimum value for maximum engine output.

In another prior art method, described in French patent application No. 2,404,121, a pressure sensor is used to detect the pressure peak in at least one cylinder of the engine in relation to the angular position of the crankshaft. The spark timing is adjusted so that this pressure peak occurs at a preselected angular position of the crankshaft. The disadvantages with this solution result from the high cost of present day pressure sensors capable of being used in this capacity, and from the requirement of having to substantially change the design of some of the parts of the engine in order to allow positioning of the pressure sensors.

SUMMARY OF THE INVENTION

Thus, it is the main object of the present invention to provide a simple solution for setting the spark to its optimum value and which does not suffer from the above indicated drawbacks of the prior art devices.

Upon further study of the specification and appended claims, further objects and advantages of this invention will become apparent to those skilled in the art.

BRIEF DESCRIPTION OF THE DRAWINGS

The invention will now be described, by way of example, with reference to the accompanying drawings wherein:

FIG. 2 diagrammatically illustrates the electronic circuitry required for controlling the ignition circuit;

FIGS. 5 and 6 are diagrammatic views in greater detail of the construction of the electronic circuitry of the invention diagrammatically shown in FIG. 2.

DETAILED DISCUSSION OF THE INVENTION

The invention is based on an observation concerning the progression of the combustion phase in the cylinder of a controlled ignition engine. It has been observed that during the combustion phase, when the spark advance is set at the optimum value corresponding to the maximum output of the engine, different values of the ratio of:

$$\frac{\text{volume of burnt gases}}{\text{overall gas volume in the cylinder}}$$

which will be referred to hereinafter as the "volumetric ratio", are obtained corresponding to well-determined angular positions of the crankshaft (within a particular range of the values of said ratio). The angular positions of the crankshaft are independent from parameters (such as the running speed, i.e., r.p.m.'s, the load on the engine, the vacuum in the intake manifold, and the like) which typically characterize the operation of the engine.

Conversely, it is possible to maintain an optimum spark advance control, irrespective of the variations of the described parameters of the operating conditions, by adjusting the spark advance so that the different values of the above-defined volumetric ratio are obtained for the same angular positions as during operation with an optimum spark advance.

A specific embodiment of the method according to the invention comprises adjusting the spark timing so that the flame front within the combustion chamber reaches a predetermined or reference position in said chamber at a predetermined angular position of the crankshaft; more specifically, the angular position corresponding to the optimum spark advance.

It has been experimentally ascertained that the values of the ratio of the burnt gases to the overall gas volume in the cylinder which normally comprise between 0.4 and 0.9 correspond to angular positions of the crankshaft comprising between 30° before top dead center and 90° after top dead center. By way of example, for a value of about 0.75 of the volumetric ratio, the corresponding angular position of the crankshaft is comprised between 6° and 10°, more particularly, about 8° of rotation after the top dead center.

Figure 1:
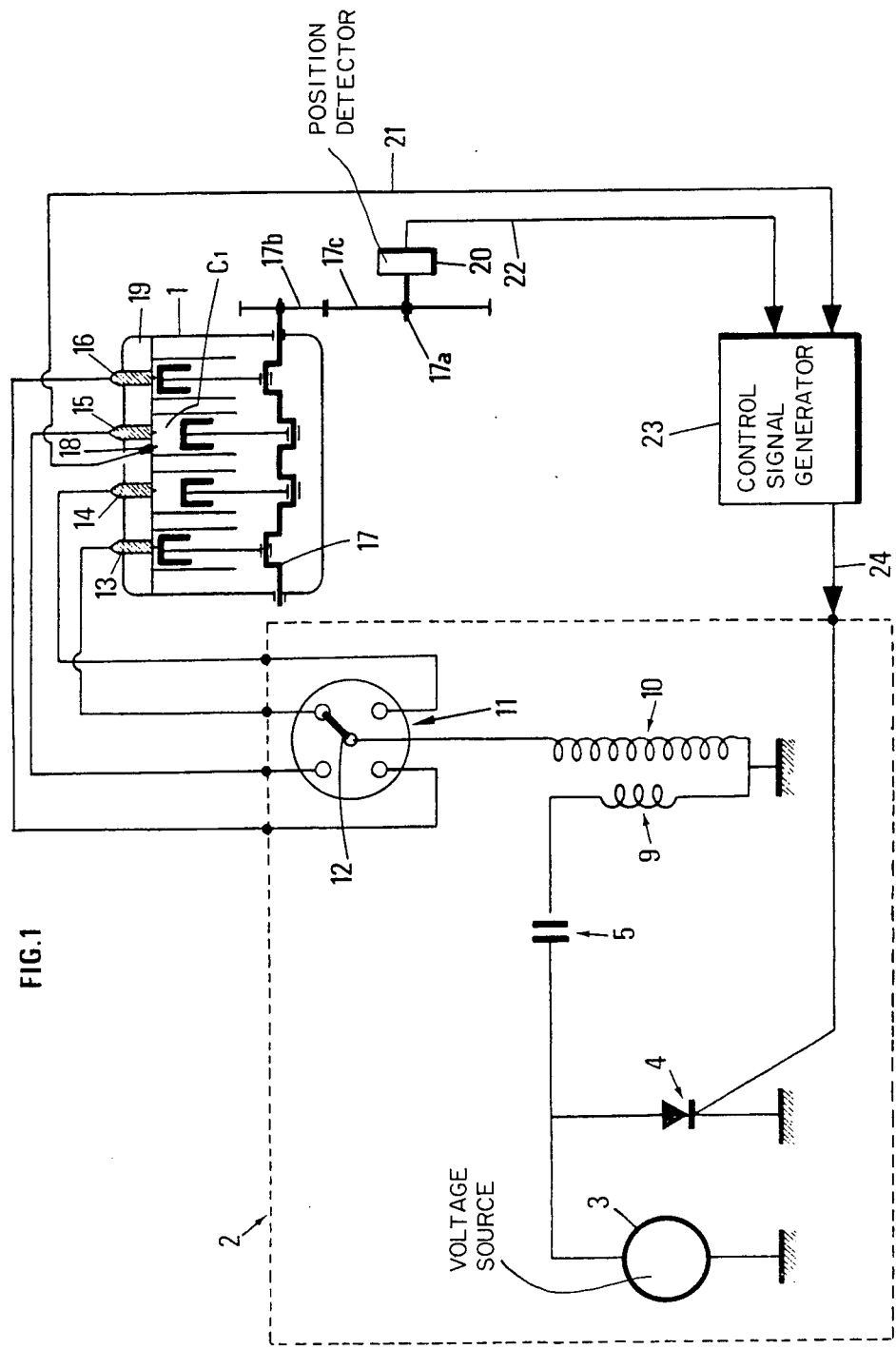
FIG. 1 diagrammatically illustrates an engine equipped with a device according to the invention.

FIG. 1 shows, by way of example, a four cylinder engine 1 equipped with an electronic ignition circuit designated as a whole by reference 2. The ignition circuit comprises a voltage source 3 connected to a capacitor discharge circuit comprising a thyristor 4 connected in parallel and a capacitor 5 connected in series to a primary winding 9 of the ignition coil. The secondary winding 10 supplies an electric current successively to spark plugs 13 to 16 of engine 1 through a distributor 11 having a rotor arm 12 rotated by the crankshaft 17 of the engine 1 through suitable driving means (not shown).

The engine is equipped with at least one sensor 18 operative for producing a signal when the ratio of the burnt gases to the overall gas volume reaches a preselected value in one cylinder, and with means 20 for detecting at least one preselected reference angular position of the crankshaft, or of a shaft rotating at half the speed of the crankshaft. Preferably, in the case of a four stroke engine, this shaft may be an auxiliary shaft 17a rotatably driven by means of a speed-reducing gear 17b–17c, so that the shaft 17a rotates at half the speed of crankshaft 17. When the engine is equipped with a distributor 11, the shaft 17a may advantageously comprise the rotor of the distributor. Sensor 18 and position detecting means 20 deliver information in the form of signals, e.g., electronic signals, transmitted respectively through conductors 21 and 22 to an electronic assembly 23 operative to automatically deliver a control signal to the ignition circuit. This signal is transmitted through a conductor 24 to the control electrode or trigger circuit of the thyristor 4.

FIG. 2 schematically shows the arrangement of the main electronic circuits of assembly 23.

As is apparent from this drawing, the signal produced by the detecting means 20 is transmitted to a circuit 25 operative to generate a signal representing the angular rotation of the crankshaft 17. The signal from sensor 18 and the signal issued from circuit 25 are received by a circuit 26 which provides a signal representative of the angular position of the crankshaft when the ratio of the volume of burnt gases to the overall gas volume reaches a predetermined value.

The last-mentioned signal is transmitted to a circuit 27 wherein it is compared with a preset reference signal and automatically computes the signal for controlling the ignition circuit.

Sensor 18 may be of a known type such as, for example, an ionisation detector comprising for example two conducting electrodes spaced from each other and connected to an electric measuring circuit.

Figure 3:
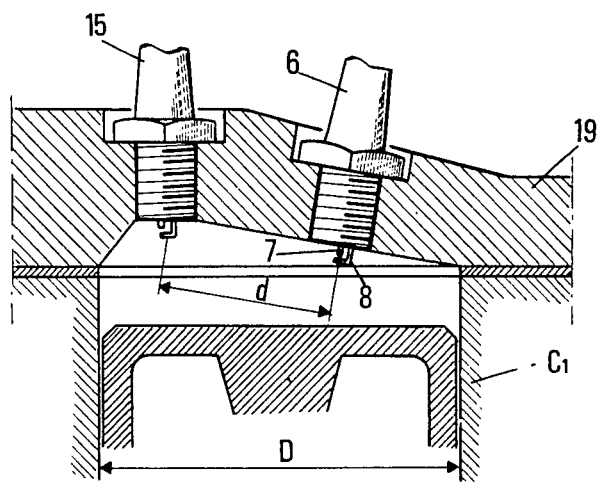
FIGS. 3 and 4 are perspective views of two possible embodiments of the sensors used in the invention.

In FIG. 3 the sensor 18 is formed by a plug 6 positioned in the cylinder head so that its electrodes 7 and 8 are located within the cylinder $C_1$ of the engine at a distance d from the electrodes of the spark plug 15.

Thus, after the beginning of the combustion initiated by the spark plug in the cylinder $C_1$, the flame front, which defines the volume of burnt gases in the cylinder, reaches during its propagation the electrodes 7 and 8 of plug 6, thus modifying the electrical conductivity between these electrodes and thereby causing a variation in the value of the electric current in the circuit (not shown) to which these electrodes are connected, this variation comprising the signal delivered by sensor 18.

The distance d is selected so that when the engine is operated with optimum spark advance control, as above defined, sensor 6 delivers a signal corresponding to a predetermined value of the ratio of the volume of burnt gases to the overall gas volume in the cylinder.

Figure 4:
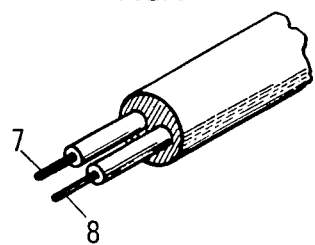

In an alternative embodiment, diagrammatically shown in FIG. 4, the electrodes 7 and 8 of sensor 6 may be made up of the bare ends of the wires of a two-wire cable which can be located in any part of the engine, including the cylinder head gasket.

An appropriately insulated single wire cable will preferably be used, the bare end of this cable forming a first electrode, and a second electrode being formed by a metal part of the engine (cylinder head, cylinder) which is grounded.

It will obviously be possible to use any other kind of sensor capable of detecting, through any physical phenomenon (for example, reflection) the location of the interface between the burnt gases and the fresh gases within the cylinder.

The sensor means 20 adapted to detect the passage of crankshaft 17, or of auxiliary shaft 17a, through a preselected reference position may also be of any known type. They may consist in particular a wheel keyed onto the crankshaft 17, or the auxiliary shaft 17a, and provided with at least one optical mark which actuates at each rotation an optical sensor such as a photo-cell.

Mechanical means may also be used, such as a cam rotatable with crankshaft 17, or with auxiliary shaft 17a, and which periodically opens or shuts electrical contacts.

FIG. 5 illustrates an embodiment of the electronic circuit 25 which receives from detector 20 a signal comprised of pulses $I_1$, $I_2$, etc. separated by a time interval which represents an angle of rotation $\alpha_R$ of the crankshaft. The value of this angle, which is preferably a sub-multiple of 360°, and at most equal to 360°, will mainly depend on the construction characteristics of the transducer 20. The time interval T is inversely proportional to the speed of rotation N of crankshaft 17, and in direct proportion to $\alpha_R$.

This time interval is given the relationship:

$$T = 6 \frac{\alpha_R}{N}$$

wherein:

T is the time interval in seconds between two successive pulses;

N is the average speed of rotation (in r.p.m.) of crankshaft 17 during the time interval T; and $\alpha_R$ is expressed in degrees.

The apparent frequency of production of pulses is given by $F = 1/T$

The signal delivered by transducer 20 is applied to a first input terminal of an AND-gate 29.

An oscillator 30 (which may be of the resistorcapacitor type) of frequency $F_1$ is connected to a "divide-by-K circuit" 31 (K being an integer greater than 1) which is itself connected, through a conductor 32, to a second input terminal of the AND-gate 29 to which it delivers pulses at the frequency $F_2 = F_1/K$, with these pulses having a period $T_2 = KT_1$. The output terminal of the AND-gate 29 is connected to an up-counting input terminal $C_{33}$ of an electric pulse counter 33. The counter 33 can be of a conventional type known in the art as "Type 7493" and sold by various manufacturers.

Upon receiving the pulse $I_1$, the AND-gate 29 delivers through its output terminal the pulses generated by circuit 31, which are summed up in the pulse counter 33 during the time interval separating the pulse $I_1$ from the pulse $I_2$.

Flip-flop circuits of the counter 33 are connected in parallel through conductors to an equal number of separate elements or flip-flop circuits of a memory circuit 34. This memory circuit may be of a type known in the art as "Type 7474".

Pulse counter 33 has a reset input terminal $RAZ_{33}$ for resetting it to zero, which is connected to transducer 20 by means of a conductor 35 incorporating conventional delay means for delaying transmission of the leading edge of pulses $I_1$ and $I_2$ to terminal $RAZ_{33}$ of pulse counter 33.

The memory circuit 34 has a loading input $Ch_{34}$ which is connected to detector 20 through a conductor 26.

Thus, when the pulse $I_2$ is generated after a rotation $\alpha_R$ of crankshaft 17, the leading edge 34A of pulse $I_2$ causes a transfer of the digital content or count equal to $(F_2 \times T)$ of pulse counter 33 into the memory circuit 34, then the leading edge 33A, received by counter 33 with a certain time lag relative to the leading edge 34A (this time lag being caused by the delay means 35A), causes the resetting of the pulse counter 33 to zero. The latter is then ready for registering additional new pulses transmitted from AND-gate 29 during a new revolution $\alpha_R$ of crankshaft 17.

The pulse storage circuit or memory 34 has its output terminals respectively connected to the set terminals of a downcounting circuit 37 (e.g., "Type 74 93").

The downcounter 37 has a downcounting input terminal $D_{37}$ connected through a conductor 38 to the output terminal of the oscillator 30 of frequency $F_1$.

Downcounter 37 also has a terminal $R_{O37}$ on which a signal appears for each zero value of downcounter 37.

The time interval $T_2$ necessary for resetting the downcounter 37 to zero, which has an initial digital content delivered by a storage circuit or memory 34 of $F_2T$, and receives downcounting pulses at the frequency $F_1$, is defined by the relationship $T_s \cdot F_1 = F_2 \cdot T$. Thus, the frequency of the zero resets of downcounter 37 is equal to:

$$F_s = \frac{F_1}{F_2 \times T} = \frac{KF_2}{F_2/F} = KF$$

wherein F is the frequency of the pulses $I_1$, $I_2$.

In other words, K pulses appear on the terminal $R_{O37}$ of the downcounter 37 during each rotation $\alpha_R$ of crankshaft 17, and the period of such successive pulses corresponds to a rotation $\alpha_R/K$ of the crankshaft.

The downcounter 37 has a loading input terminal $Ch_{37}$ which is connected to its output terminal through a conductor 39. Thus, each zero value of the count of downcounter 37 generates on the terminal $R_{O37}$ a signal which automatically resets downcounter 37 to its loading condition.

The output terminal $R_{O37}$ of downcounter 37 is connected, through a conductor 40, to an upcounting terminal $C_{28}$ of a circuit diagrammatically shown at 28 which may comprise m elementary circuits of the shift register type ("Type 74164", for example) each comprising eight output terminals. The different output terminals of circuit 28 then deliver a pulse for each unitary angle of rotation of the crankshaft equal to $\alpha_R/K$, the arrangement of these output terminals making it possible to distinguish from 0 to $(8^m - 1)$ pulses delivered by downcounter 37.

Each of the pulses emanating from downcounter 37 causes an increment in the count of circuit 28 which will generate, at any time, a signal representing the number of pulses received during the time interval $$T = (8^m - 1) T_s = \frac{(8^m - 1)}{K} T,$$

wherein $K \geq 8^m - 1$.

In other words, circuit 28 which constitutes an "angular clock", operates as a shift register circuit having $8^m$ output terminals numbered from 0 to $(8^m - 1)$ as shown in FIG. 3, so that the rotation of crankshaft 17 can be followed, from its reference position, for successive angles of rotation of $\alpha_R/K$, assuming that the speed of rotation of crankshaft 17 can be considered as constant during the time interval T separating two successive pulses $I_1$, $I_2$, etc. It is thus apparent that, by properly selecting the values of $\alpha_R$ and K, it becomes possible to accurately follow the rotation of the crankshaft 17. Generally, the values of $\alpha_R$ and K will be selected so that the value of the angle $\alpha_R/K$ is comprised, for example, of between 0°30' and a few degrees, the circuit 28 being then optionally composed of three elementary circuits of the shift register type, each having eight output terminals.

The circuit 28 has a reset terminal $RAZ_{28}$ for resetting it to zero, and the terminal is connected to the detector 20 through a conductor 41, so that the circuit 28 can be reset to zero by each pulse $I_1$.

The shift register 28 permits the selection of an "angular window" or angular interval whose usefulness will be made apparent below. To this end, the two output terminals of shift register 28 corresponding to the two angular values defining this angular window are respectively connected to the two input terminals of a flip-flop circuit 42 of the set-reset type. Thus, the flip-flop 42 delivers, on its output terminal, a rectangular shape signal between the two angular positions which defines the selected "angular window". This rectangular signal begins when a first pulse appears on the output terminal of shift register 28, this pulse corresponding to the first limit-angle of the angular interval (first change of state of the flip-flop 42), and this rectangular signal ends when a second pulse appears on the output terminal of shift register 28, this pulse corresponding to the second limit-angle of the "angular window" (second change of state of the flip-flop 42).

Figure 6:
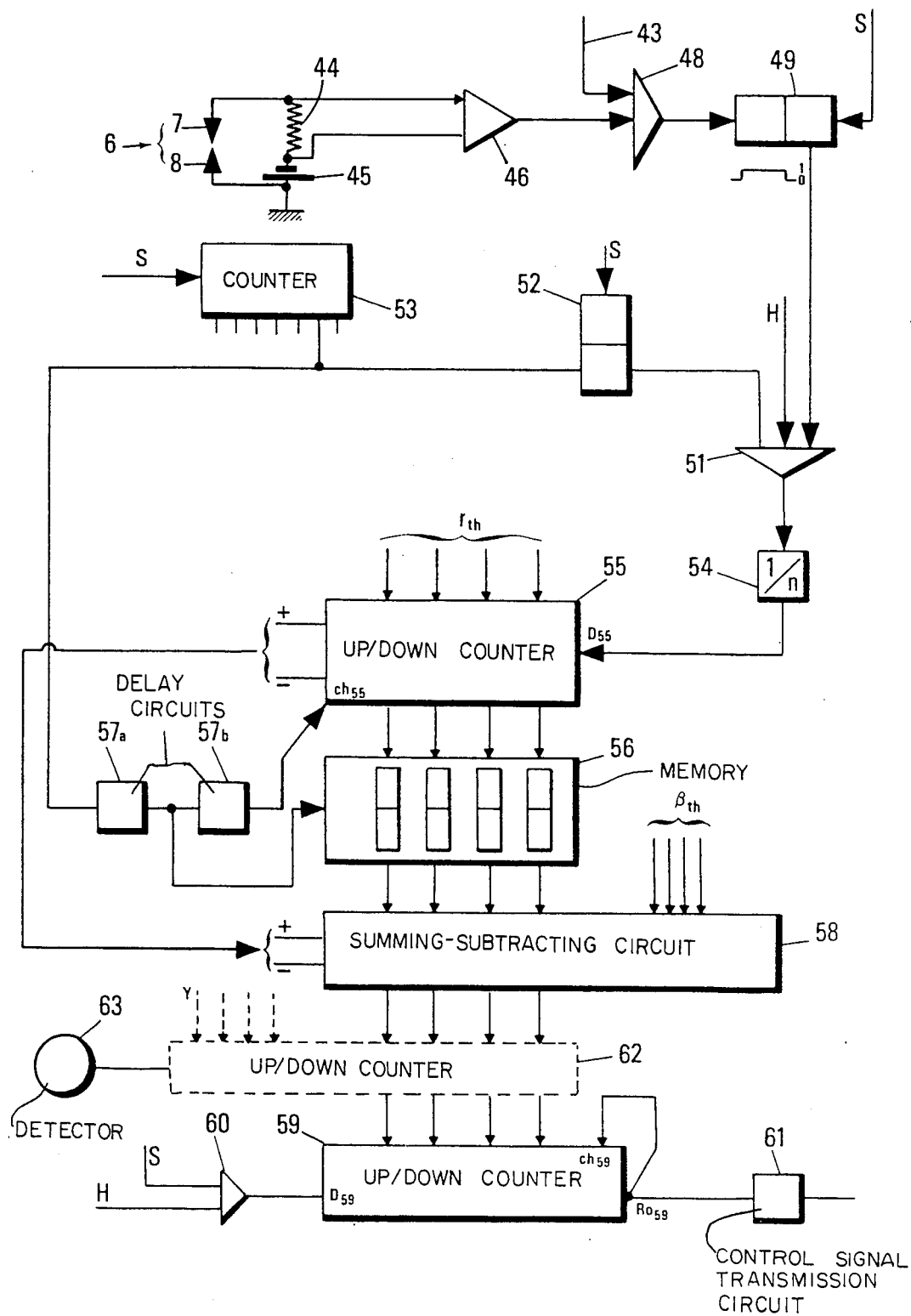

FIG. 6 diagrammatically illustrates the arrangement of the circuits 26 and 27 of FIG. 2, which together with circuit 25 form the electronic assembly 23.

As apparent in this drawing, the electrodes 7 and 8 of sensor 6 are connected in series to a resistor 44 and a source of direct voltage 45.

As already indicated, when the flame front reaches electrodes 7 and 8, the electric current passing through resistor 44 and the voltage between its terminals increases. It has been experimentally ascertained that the change in the voltage at the terminals of resistor 44 occurs very rapidly. The signal representing this voltage is applied, optionally through an adaptor-amplifier 46, to an input terminal of a AND-gate 48 which transmits this signal to a flip-flop 49 when gate 48 receives at the same time a validation signal.

In the embodiment of FIG. 1 only the phenomena occurring in one selected cylinder $C_1$ is observed based on the assumption that these phenomena are similar in the remaining cylinders, and that the ignition timing will be the same for each cylinder.

To this end there is used as a validation signal the signal supplied by the flip-flop 42 which is connected to circuit 28 (FIG. 5), so that this validation signal only appears for predetermined angular positions of the crankshaft 17 wherein the flame front in the cylinder $C_1$ is likely to reach the sensor 6 during engine operation.

In addition to the signal delivered by the AND-gate 48, the flip-flop 49 receives a synchronizing signal S which may consist of the pulses I produced by detector 20 cooperating with a shaft rotating at half the speed of rotation of the crankshaft 17.

The output terminal of flip-flop 49 which is initially in the "zero state", is switched to the "one" state upon receiving the signal S, and is reset to the "zero" state upon receiving the validation signal delivered by the AND-gate 48. There is thus obtained a rectangular shape signal whose width is a function of the angle $\theta$ of rotation of crankshaft 17 between its reference position and the position corresponding to the production of the signal by sensor 6. This signal is transmitted to a first input terminal of an AND-gate 51 which receives on a second input terminal, the output pulses of circuit 28, or of an angular clock H. To a third input terminal of circuit 51 is applied the output signal of a flip-flop 52 which is controlled by the synchronizing signal S and by the output signal from a counter 53 of the shift register type ("Type 74164", for example). This circuit counts the synchronizing pulses S and delivers, on one of its output terminals, a signal representing a number n of working cycles of the engine.

Upon receiving a first synchronizing signal, the AND-gate 51 simultaneously receives the signal delivered by flip-flop 49 and the signal delivered by flip-flop 52 which constitute the validation signals, and gate 51 permits passage of $\theta K/\alpha_R$ pulses from clock H during the entire duration of the signal produced by flip-flop 49. The same phenomenon occurs during n working cycles of the engine (n being an integer equal to or greater than 1) and the cycle counter 53 delivers a signal which changes the state of flip-flop 52. The number of pulses which have passed through the AND-gate 51 is divided by the number of cycles n by circuit 54 which delivers an average count $$r_m = \frac{\theta_m \cdot K}{\alpha_R}$$

representing the average value of the angle $\theta_m$ of rotation of crankshaft 17 from its reference position to the position corresponding to the production of a signal by sensor 6.

These pulses are applied to a downcounting terminal $D_{55}$ of an up/down counter 55 ("Type 74193, for example") which has been initially set at a theoretical value $r_{th}$ of the pulse number, corresponding to a theoretical angular interval $\theta_{th}$ between the reference position of crankshaft 17 and the position at which sensor 6 should deliver a signal, taking into account said predetermined value of the ratio of the volume of burnt gases to the overall gas volume in the cylinder.

The absolute value of the difference $r_{th} - r_m$ representing the difference $\epsilon = \theta_{th} - \theta_m$ appears on output terminals of counter 55 which are connected to input terminals of a memory 56 ("Type 74174, for example"), the sign of this difference is indicated by the two output terminals generally designated as a "carry" terminal and a "borrow" terminal.

Transfer of the information $\epsilon$ from counter 55 to memory 56 is achieved by the pulse generated by cycle counter 53, this pulse being delayed by a delay circuit 57a. The same pulse, further delayed in a delay circuit 57b, resets the up/down counter 55 to its initial state through an input terminal $C_h$ 55. The memorized information $\epsilon$ is applied to a summing-subtracting circuit 58 ("Type 7483") to which is also applied the value $\beta_{th}$ representing the theoretical angular interval between the reference position of the crankshaft and that of the ignition, to which corresponds the theoretical angular delay $\theta_{th}$ above defined, between said reference position and that of the flame front detection by sensor 6 in cylinder $C_1$.

The circuit 58 delivers a signal representing the value $$\beta_{com} = \beta_{th} \pm \epsilon$$

of the angle of rotation of the crankshaft 17 between the reference position and the actual position at which ignition should occur in the cylinder $C_1$. This signal is applied to the set terminals of an up/down counter 59 ("Type 74193") whose downcounting terminal $D_{59}$ is connected to the output of an AND-gate 60 which receives the synchronizing signal S on a first input terminal, and the signal from the angular clock H on a second input terminal. At each zero value the counter 59 delivers on a terminal $R_{0\,59}$ an ignition control signal which is transmitted, through a suitable circuit 61, to the trigger circuit of thyristor 4 and to a loading terminal $C_{h59}$ of counter 59 to provide resetting of this counter.

Changes may be made in the above-described device without departing from the limits of the present invention. It is, for example, possible to separately adjust the ignition timing for each of the cylinders of the engine by using as many circuits comprised of the elements 48 to 61 as may be required.

In some operating conditions of the engine, the ignition timing may be adjusted over a longer or shorter time interval to a value which differs from the optimum value, for example when it is desired to have a faster temperature rise during the engine starting periods. An up/down counter 62 may be placed between the circuits 58 and 59 (as shown in dotted lines in FIG. 4) for adjusting the value $\beta_{com}$ by adding thereto an algebraic correction value Y. Such a modification may be effected either permanently or temporarily. In the latter case, the duration of the correction value may be either constant or a function of a parameter measured by a detector 63.

Such corrections may also be carried out upon the occurence of knocking of the engine, or with a view toward obtaining in the exhaust gases the smallest possible content of polluting compounds, and the like.

A correction Y of appropriate value may be applied when the engine does not deliver its maximum output, or when the value of the ratio of the volume of burnt gases to the overall gas volume in the cylinder is not comprised between 0.4 and 0.9.

Displaying of the correction Y whose values may have been determined beforehand for different working conditions, may be programmed in relation with these different working conditions.

The above described method and device for controlling the ignition in an engine cylinder will also suffer from disadvantages at times inasmuch as experience has shown that the conditions under which combustion occurs in the cylinders are variable. The detection of the flame front by an ionization detector at the "angular window" determined by the flip-flop circuit 42 presents various uncertainties. More specifically, the detection is not effected for all the cycles of operation of the motor. Under these conditions, it is possible that the adjusting of the ignition timing performed is not satisfactory. Thus, in order to remedy the problems noted, an improved method of achieving the objects of the invention is proposed, in the case of a motor having at least two cylinders.

Figure 7:
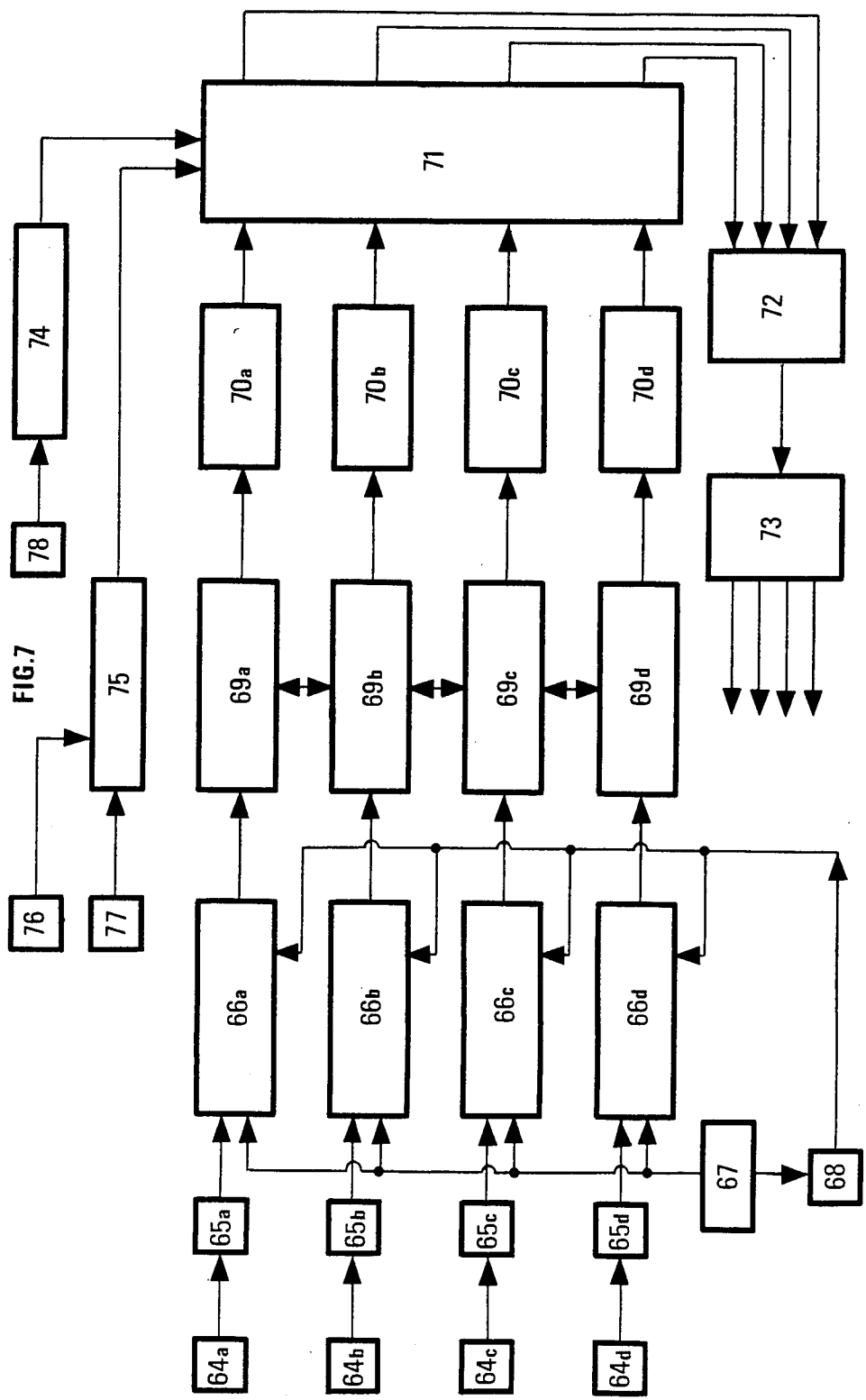
FIG. 7 illustrates in block form the operation of the preferred embodiment of the invention.

This method is described hereinafter with reference to FIG. 7 which is applied, for purposes of example only, to a motor having four cylinders A, B, C and D (not shown). The circuit elements associated with the same cylinder are identified in said figure, for example by the subdesignation a, b, c, or d depending on the cylinder of association.

Each cylinder is equipped with respective ionization detectors 64a, 64b, 64c or 64d which transmit a signal for each instance the flame front passes a reference position. The signal from each detector is an analog signal which is converted into a digital signal in analog-to-digital convertors 65a, 65b, 65c and 65d.

The signal from each ionization detector is then transmitted to respective reference angular position circuits 66a, 66b, 66c or 66d which references, i.e., correlates, the detected angular position of the crankshaft 17 to the corresponding signals received from the ionization detectors, and transmit corresponding signals representative of said detected crankshaft 17 angular position as will be clarified hereinafter. Such circuits are conventional and obvious to one skilled in the art. An example of such a circuit is illustrated in FIG. 6. The operation of each of the circuits 66a to 66d is synchronized by a clock 67, for example of the type described with reference to FIG. 5.

A validation circuit 68, associated with the clock 67, validates the operation of each circuit 66a to 66d for each complete angular rotation of the motor shaft corresponding, for each cylinder, to a specific angular interval of rotation of the crankshaft 17 over which a specified one of the ionization detectors transmits a signal.

Such a circuit may be of the type illustrated by circuit 42 in FIG. 2 which determines "angular-window" during which the signal of the ionisation detector has to be produced.

The signal produced by each of the reference angular position circuits 66a–66d is transmitted to respective reference generating circuits 69a to 69d.

Each reference generating circuit is adapted, for each cycle of operation of the cylinder associated therewith, to deliver a reference signal after having sequentially performed the following operations:

(a) count the number of signal p delivered by the corresponding ionization detector during a specified number of cycles of operation preceding the delivering of the reference signal, said specified number being at most equal to a reference value Q.

(b) establish the average value of the angular positions of the crankshaft for which the ionization detector transmits the p signals, as soon as the number p of signals delivered by the detector reaches a predetermined value P for a number of cycles of operation less than the value Q, (c) take into account the average value established by one of the other reference generating circuits corresponding to one of the other cylinders at the end of the Q cycles of operation when the number p falls at a value less than P, and (d) produce the reference signal representative of the average value obtained in steps (b) and (c), and thereby using this representative reference signal for controlling the ignition timing, as will be described hereinafter.

The values of P and Q are determined for each type of motor so as to obtain a satisfactory operation thereof. In the case for example, of an automobile motor of 78kW power output, excellent results are obtained when the following values are adopted:

$P = 8$ and $Q = 16$

In addition, at the time of said test, a reference generating circuit corresponding to the first cylinder of the motor, is adapted to adopt when necessary, the average value of angular position of the crankshaft (determined by the procedure of step (b) indicated above) provided by the reference generating circuit corresponding to the cylinder in which the spark has occured most recently.

The signal delivered by each reference generating circuit 69a to 69d is transmitted to respective circuits 70a to 70d, adapted for determining a value for the ignition timing such that the flame front reaches the ionization detector at a time coinciding with a predetermined position of the crankshaft, and delivers a principal command signal representative of said value of the ignition timing.

The principal command signal is transmitted to a selecting circuit 71 whose utility, as becomes evident so far, is to activate a high voltage generator 72 which, by means of a distributor 73, powers the corresponding spark plug.

The circuits 72 and 73 are, for example, of the type described with reference to FIG. 1, designated by the reference number 2.

Thus, during normal operation, the spark advance is controlled by the detection of the flame front in at least one of the cylinders of the motor, i.e., for each cylinder there is fixed a value for the ignition timing such that the flame front reaches a reference position at the time the motor shaft is at a predetermined angular position.

In any event, as previously indicated, there can exist conditions of operation of the motor for which the principal command signal is not transmitted by the circuits 70a–70d. Such a case is for example, when starting the motor, when at that time the value p is less than P for all of the cylinders of the motor, or when the ionization detectors 64a to 64d fail to transmit any signal, or as a result of the electrical conductors for transmitting the signals from the ionization detectors breaking.

In such a case, there is provided a circuit 75 adapted for delivering a secondary command signal which corresponds to a predetermined ignition timing value. This value can be either constant or variable based on at least one parameter characterizing the operation of the motor, such as for example, the speed of rotation, i.e., r.p.m.'s, of the motor measured by the detector 76 and/or the vacuum pressure in the intake manifold measured by a detector 77.

The circuit 75 for generating a secondary command signal can be of any known type and need not be described in detail. Such a circuit is for example, of the type employed on RENAULT automobiles and known by the reference designation RENIX S 100001-001. Once generated, the secondary command signal is transmitted to the selecting circuit 71.

There is also provided a security circuit that generates a priority command signal when particular operating conditions of the motor appear and are sensed by an appropriate detector 78. For example, but not intended in a limiting manner, the detector 78 will deliver a signal when it appears that one of the cylinders is experiencing run-on, i.e., continuous combustion, or when knocking occurs. The circuit 74 then generates a priority command signal for modifying the spark advance to cause the knocking to disappear. Such a circuit can be of a known type, for example but not restricted to one like that disclosed in U.S. Pat. No. 4,120,272.

The priority command signal is then transmitted to the circuit 71. At that time, the circuit 71 selects between the principal command signal, the secondary command signal and the priority command signal, with the selected one actuating the high voltage generator 72 which, through distributor 73 successively powers the spark plugs (not shown) off the motor.

Such a circuit is conventional in the art and does not necessitate a complete description. The working of said circuit is indicated below.

The choice of command signal is effected as follows:
(a) when the priority command signal appears at the selector 71, the selector transmits said signal to the high voltage generator 72,
(b) if there is no priority command signal appearing,
  (1) selector 71 transmits the primary command signal to the high voltage generator if it exists, and
  (2) in the absence of the primary command signal, the secondary command signal is transmitted to the high voltage generator.

Preferably, the reference circuits 65a to 71 can comprise either preprogrammed microprocessors when they are manufactured, or programmable microprocessors such as INTEL 8085 associated with ROM PROM or REPROM memories.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of adjusting the ignition timing of a controlled ignition engine comprising at least two cylinders having knock detecting means associated therewith, and means for adjusting, according to the spark timing in each cylinder, the angular position of the crankshaft to correspond to the time the flame front reaches in each cylinder a fixed reference position, the method comprising:
  (a) adjusting the ignition timing when knocking occurs in at least the one cylinder wherein said knocking is detected, to eliminate said knocking;
  (b) in the absence of knocking, and separately for each cylinder, detecting the passage of the flame front through said reference position, and when said detection is performed a predetermined number of times P for a number of cycles of operation of the engine at most equal to a predetermined number Q, generating an average value of the values of the angular position of the crankshaft corresponding to the times when said flame front is detected, and producing a new value for the ignition timing based on said average value of the angular position with respect to which said average value is a predetermined value, the new value for the ignition timing for said one cylinder being used for controlling the ignition timing of the other cylinder if the number of times the flame front is detected in the other cylinder is less than the value P for said number of cycles Q; and
  (c) in the absence of knocking and when the detecting of the number of flame fronts in each cylinder, being not less than P for the number of cycles Q, adjusting the ignition timing in each cylinder by a predetermined amount which is a function of at least one parameter characteristic of the operation of the engine.

2. A method of adjusting the ignition timing of a controlled ignition engine as in claim 1, comprising delivering a primary command signal for controlling ignition timing in the event no signal is received from said knock detecting means corresponding to a predetermined ignition timing value determined in relation to a selected engine parameter characterizing the operation of the engine.

3. A method of adjusting the ignition timing of a controlled ignition engine as in claim 1, comprising delivering a priority command signal when knocking occurs for adjusting the ignition timing to eliminate said knocking.

4. A method of adjusting the ignition timing of a controlled ignition engine as in claim 1, comprising adjusting the ignition timing, in the absence of knocking and the detecting of the number of flame fronts in each cylinder being not less than P for the number of cycles Q, by delivering a secondary command signal determined by at least one parameter characteristic of the operation of the engine.

5. A method of adjusting the ignition timing of a controlled ignition engine, comprising the steps of detecting in at least one cylinder the time of passage of the interface between the burnt gases and the fresh gases through a reference position in the combustion chamber during the combustion phase, and adjusting the ignition timing to cause said time of passage to coincide with the time of passage of the crankshaft through a predetermined angular position selected so as to obtain optimum operation of the engine, and wherein said reference position corresponds to the interface between burnt gases and the fresh gas wherein the ratio of the volume of burnt gases to the overall gas volume in the cylinder comprises 0.4 to 0.9.

6. A method according to claim 5, wherein said reference position corresponds to angular positions of the crankshaft comprising between 30° before top dead center position and 90° after top dead center position.

7. A method according to claim 5, wherein said ratio of the volume of burnt gases to the overall gas volume in the cylinder is substantially equal to 0.75.

8. A method according to claim 6, wherein said reference position corresponds to angular positions of the crankshaft comprising between 6° and 10° of rotation after the top dead center position.

9. A method according to claim 7, wherein said reference position corresponds to angular positions of the crankshaft comprising between 6° and 10° of rotation after the top dead center position.

10. A method according to claim 6, wherein said reference position corresponds to an angular position of top dead center.

11. A method according to claim 7, wherein said reference position corresponds to an angular position of top dead center.

12. A method of adjusting the ignition timing of a controlled ignition engine as in claim 1, wherein the predetermined number of said performed detections P is equal to 8.

13. A method of adjusting the ignition timing of a controlled ignition engine as in claim 1, wherein the predetermined number of cycles of operation Q is at most equal to 16.

14. A method of adjusting the ignition timing of a controlled ignition engine as in claim 12, wherein the predetermined number of cycles of operation Q is at most equal to 16.

15. A method of adjusting the ignition timing of a controlled ignition engine as in claim 4, wherein the predetermined number of said performed detections P is equal to 8.

16. A method of adjusting the ignition timing of a controlled ignition engine as in claim 4, wherein the predetermined number of cycles of operation Q is at most equal to 16.

* * * * *